Oct. 8, 1946.  J. SIVERTSEN  2,409,161

BOURDON TUBE

Filed Feb. 22, 1943

INVENTOR.
Jens Sivertsen
BY
Herbert F. Fairbanks

Patented Oct. 8, 1946

2,409,161

UNITED STATES PATENT OFFICE 2,409,161

BOURDON TUBE

Jens Sivertsen, Philadelphia, Pa.

Application February 22, 1943, Serial No. 476,744

3 Claims. (Cl. 73—418)

The object of this invention is to devise a novel Bourdon tube to the end that the tube will have greater accuracy and sensitivity than is present in Bourdon tubes as now manufactured.

Increased accuracy and sensitivity are of special importance at this time due to the large quantities of instruments using Bourdon tubes required for the war efforts, and the fact that the driving mechanism will not require such a high degree of workmanship, accuracy and finish as today is deemed necessary to obtain proper indications.

Bourdon tubes have been used for many years as the sensitive element of pressure meters, and their use has been expanded to be used in many different ways and for many different types of instruments, such as, for example, indicators and recorders of wind velocity, aeroplane speeds, and many others too numerous to herein specifically mention.

With the foregoing and other objects in view as will hereinafter clearly appear, my invention comprehends a novel Bourdon tube.

Other novel features of construction will hereinafter appear in the detailed description and the appended claims.

For the purpose of illustrating the invention, I have shown in the accompanying drawing a typical embodiment of the invention which, in practice, will give satisfactory and reliable results. It is, however, to be understood that the various instrumentalities of which the invention consists can be variously arranged and organized, and the invention is not limited to the exact arrangement and organization of these instrumentalities as herein set forth.

Similar numerals of reference indicate corresponding parts.

Figure 1:
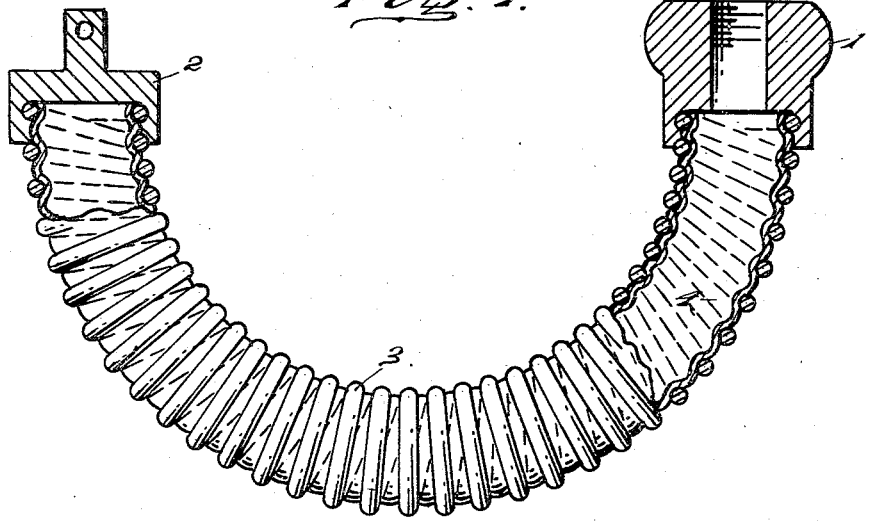
Figure 1 is a side elevation of a Bourdon tube, embodying my invention, and shown partly in section.

Referring to the drawing: 1 designates the socket and 2 the tip of a Bourdon tube embodying my invention. The socket and tip are recessed to receive the ends of the tube proper which is sealed therein in any desired or conventional manner.

In Figure 1, I have shown a coil spring 3, within which a tube 4 is contained. This tube may be of plastic, rubber, thin copper, or of any suitable elastic material. If the tube 4 is metallic, it preferably provides in conjunction with the spring elastic, curved bridge portions between stronger portions as shown.

A Bourdon tube operates on the principle that an internal pressure will change its physical dimensions and shape. The socket end of the tube is fixed in space, and the front end, or tip, when unit pressure is applied to the tube, will move to a new position, or, in other words, will have a tip travel. The indicating means is usually connected by a linkage to the tip and actuated by the tip travel, which is usually magnified by the indicating means. In most Bourdon tubes, the tip travel is small. The only way today to increase sensitivity is to flatten the tube.

When the internal pressure is released to its starting value, the tip should return to its starting position, otherwise the tube is of little value as a dependable, elastic measuring medium. To make sure that the tube will return to its initial starting position after the release of the pressure, the strain must be within the proportional limit of the stress-strain curve, or, at least, inside of the elastic limit for all parts of the tube and in all directions. This is very important.

Figure 2:
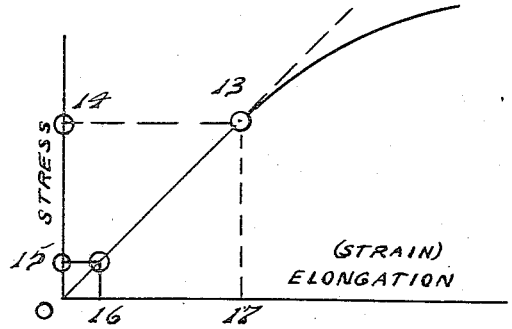
Figure 2 is a diagram of a stress-strain curve.

If we now consider Figure 2, which is a stress-strain diagram of a material, we find that from 0–13 the curve is a straight line, according to Hooke's law, and this point can also be considered to be the elastic limit, for all practical intents and purposes. The higher we can go on this curve within this limit, the more sensitive is our tube. This must be clearly understood to enable one to design tubes to obtain higher stresses and strains and increased tip travel, since the tip travel is a direct function of the strains.

We will now make an approximate investigation of the stress in a tube.

The origin of all forces and strains is the pressure inside the tube.

For an approximate investigation, we will consider only the end pressure which tends to lengthen the tube, and the wall pressure which tends to burst the tube; the most commonly recognized fact, that the inner and outer curves have different lengths whereby unbalanced forces act to distort the tube, we will not consider. Real investigations have been made and are quite complicated, but, as we are only interested in the relative stresses, the following, simple investigation is deemed to be sufficient.

We will assume that

P equals the pressure inside the tube.
A equals the area at the end of the tube.
$q$ equals the transverse cross sectional area of the wall of the tube, a circular or elliptical section.
$r$ equals radius of the transverse cross section, if circular.
$t$ equals thickness of the wall of the tube.
$S_a$ equals axial stress.
$S_d$ equals diametrical stress.
($\Delta l$) equals infinitesimal length along axis of tube.

The axial stress for all sections will be $$S_a = \frac{AP}{q}$$

and for circular sections $$S_a = \frac{\pi r^2 P}{2\pi r t} = \frac{1}{2}\frac{rP}{t}$$

The diametrical stress will be $$S_d = \frac{\text{largest tube axis}}{2t(\Delta l)}(\Delta l P)$$

and for circular sections, this is $$S_d = \frac{2r(\Delta l)P}{2t(\Delta l)} = \frac{rP}{t}$$

For a tube with circular cross section, the diametrical stress, i. e. the stress tending to burst the tube, is twice as high as the axial stress tending to elongate the tube. (This is common for all circular tubes.)

For a flattened tube of elliptical cross section, where $a$ equals one half of the major axis, and $b$ equals one half of the minor axis we obtain $$S_a = \frac{\pi ab P}{\pi(a+b)t} = \frac{abP}{(a+b)t}$$

and the largest bursting strain is $$S_d = \frac{2a(\Delta l)P}{2t(\Delta l)} = \frac{a}{t}P$$

The relation between bursting and axial stress, we can call $\mu$, and will be for circular cross section $$\mu = \frac{rP}{\frac{1}{2}rP} = 2$$

For elliptical cross section, where $n$ denotes ratio between major and minor axis, i. e., $a$ equals $\mu b$.

$$\mu = \frac{S_d}{S_a} = \frac{\frac{nbP}{t}}{\frac{nb^2P}{(n+1)bt}} = n+1$$

for $n=2$    $\mu=3$
$n=4$    $\mu=5$
$n=8$    $\mu=9$
$n=10$   $\mu=11$ etc.

We see from this that a flattening of the tube makes the ratio between bursting and axial strains much worse, in other words, the flattening partly defeats its own purpose because the pressure is limited by the allowable bursting strain, and as the pressure is limited so is the axial stress and elongation, and the axial elongation characteristic is one of the main features in which we are interested.

When a Bourdon tube straightens out, the tube gets longer more along its inside curve than the outside curve. This is what we desire, and the tip travel is greatly dependent on how much elongation, i. e. strain is permissible in an axial direction.

Assuming, see Figure 2, that we have a tube of elliptical cross section $$\frac{a}{b} = n = 4, \mu = 5$$

which means that the axial stress and strain is only one fifth the diametrical or bursting strain. If, therefore, 0–14 is the maximum bursting stress, the maximum diametrical stress is 0–15 which limits the strain to 0–16, which is only one fifth as much indication as was possible with the same material if we could bring the axial strain up to 14. This is the essence of our aim, because if it can be accomplished in a simple way, a major improvement in Bourdon tube design has been accomplished.

Therefore it is evident that a conventional Bourdon tube is weak against bursting strains in planes transverse to its axis, and too strong in planes through or tangential to its axis. In other words, the tube is strong longitudinally and weak transversely.

If we now consider a coil spring, which can be formed from spring wire, we have a structure with entirely opposite characteristics, and these are the desired characteristics. The structure has great strength against bursting, and has great elastic flexibility along its axis. A coil spring alone, however, would not serve as a container for a pressure fluid. We must, therefore, provide a container of greater flexibility to be bonded with the spring. The container would not in itself have the strength to withstand the internal pressure but will serve to transmit the pressure to the coils or turns of the spring.

A Bourdon tube has two entirely different functions. One is to serve as a container for the pressure fluid, and the other is to serve as an elastic measuring medium.

This disclosure shows how to separate these functions by two different mediums, or to construct a medium which will fulfill both functions with results not heretofore attained with Bourdon tubes.

One way to demonstrate the principle is to wind a coil spring having the inside diameter equal to the outside diameter of a rubber hose. The axis of the spring is given the desired starting form, commonly part of a circle and elliptical in cross section, if necessary by annealing and hardening. The tube is closed at one end by some kind of a tip supported by the spring, and the tube must be fluid tight.

Another way is to bond the elastic material directly to the spring after the latter has been given its starting form and hardened. Many modern plastic materials are well suited for this purpose, and can be molded and bonded to the spring at temperatures below the annealing temperature of the spring. Many plastics have an elastic deformation (inside the elastic limit) of high magnitude and a low modulus of elasticity. They are not plastic material in the technical sense of the word but elastic material.

As a comparison, the best steel has an elastic deformation less than .007 inch, corresponding to a proportional limit of 210,000 lbs. inch², and beryllium copper might have as high as .010 inch elastic deformation before reaching the elastic limit.

In contrast, many of the so-called plastics have an elastic deformation over .10 per inch, i. e. ten times more.

If a coil spring is used, the characteristic of the tube will mainly be decided by the materials in the spring in so far as the elastic limit of the stress-strain curve is concerned.

In so far as I am aware, I am the first in the art to devise a Bourdon tube having the characteristics herein set forth, and I therefore desire to have the claims receive the broad and generic interpretation to which a pioneer in the art is entitled.

Having thus described my invention, what I claim as new and desire to secure by Letters Patent is:

1. A Bourdon tube having a composite wall formed of a tube to seal the internal pressure and an encircling spring, the tube being within the spring and expanded outwardly between adjacent turns of the spring to form elastic bridge portions, whereby radial and axial strains on the Bourdon tube are substantially equalized and maximum tip travel is obtained.

2. The construction specified in claim 1 wherein the sealing tube is metallic.

3. A Bourdon tube having a socket, a tip and a composite tubular wall connected with said tip and socket, said wall comprising a metallic tube incapable in itself of withstanding the bursting strains of the internal pressure in the tube, and a helical spring in close engagement with the metallic tube, said metallic tube being expanded between adjacent turns of the spring, whereby radial and axial strains in all directions are equalized and maximum tip travel is obtained.

JENS SIVERTSEN.